United States Patent [19]
Conrad et al.

[11] Patent Number: 5,533,650
[45] Date of Patent: Jul. 9, 1996

[54] HOPPER WITH MOVING WALL AND METHOD OF MAKING AND USING THE SAME

[75] Inventors: Peter E. Conrad, Freemont; Timothy W. Saunders, Belmont, both of Calif.

[73] Assignee: Stamet, Inc., Los Angeles, Calif.

[21] Appl. No.: 95,282

[22] Filed: Jul. 21, 1993

[51] Int. Cl.$^6$ .................................. B65G 65/40
[52] U.S. Cl. ..................... 222/161; 222/198; 222/202; 222/181.1
[58] Field of Search .................... 222/161, 198, 222/196, 202, 203, 199, 160, 181, 185, 1; 277/227, 233, 237 R

[56] References Cited

U.S. PATENT DOCUMENTS

| | | | |
|---|---|---|---|
| 214,040 | 4/1879 | Hobbs | 209/245 |
| 1,324,930 | 12/1919 | Schaffer | 222/202 X |
| 1,570,795 | 1/1926 | Tainton | 222/202 X |
| 1,644,175 | 10/1927 | Church | 222/202 |
| 1,657,782 | 1/1928 | Berg | 222/145 X |
| 2,246,497 | 6/1941 | Beck | 222/161 |
| 2,299,394 | 10/1942 | Jolly | 222/198 |
| 2,803,380 | 8/1957 | Witte | 222/202 X |
| 2,905,365 | 9/1959 | Thayer et al. | 222/198 |
| 2,982,410 | 5/1961 | Barr et al. | 209/245 |
| 3,099,494 | 7/1963 | Heinze | 222/202 X |
| 3,135,432 | 6/1964 | McKinney | 222/185 |
| 3,147,144 | 9/1964 | Wilhelm | 222/161 |
| 3,261,592 | 7/1966 | Dumbaugh et al. | 222/161 X |
| 3,286,886 | 11/1966 | Burgess, Jr. | 222/196 |
| 3,363,806 | 1/1968 | Blakeslee et al. | 222/196 |
| 3,420,480 | 1/1969 | Matson | 414/375 X |
| 3,616,969 | 11/1971 | Koizumi | 222/191 |
| 4,083,475 | 4/1978 | Venner et al. | 222/198 |
| 4,383,766 | 5/1983 | Eriksson | 222/203 X |
| 4,516,674 | 5/1985 | Firth | 198/617 |
| 4,522,500 | 6/1985 | Hyer | 222/198 |
| 4,545,509 | 10/1985 | Musschoot et al. | 222/181 X |
| 4,546,872 | 10/1985 | Musschoot | 222/199 X |
| 4,954,034 | 9/1990 | Nelson et al. | 414/156 |
| 4,988,239 | 1/1991 | Firth | 198/617 |
| 5,051,041 | 9/1991 | Firth | 198/617 |

FOREIGN PATENT DOCUMENTS

| | | | |
|---|---|---|---|
| 2814486 | 12/1978 | Germany | 222/185 |
| 0111692 | 4/1989 | Japan | 222/196 |
| 4-4294779 | 10/1992 | Japan | 222/203 |
| 0600057 | 3/1978 | U.S.S.R. | 222/196 |
| 0679494 | 8/1979 | U.S.S.R. | 406/138 |
| 0958267 | 9/1982 | U.S.S.R. | 222/198 |
| 1640052 | 4/1991 | U.S.S.R. | 222/196 |

Primary Examiner—Andres Kashnikow
Assistant Examiner—Lisa Douglas
Attorney, Agent, or Firm—Loeb & Loeb

[57] ABSTRACT

An improved hopper includes a pair of opposed live walls and a pair of opposed fixed walls, wherein at least one live wall is moveable relative to at least one other wall. The hopper is suitable for controlling the flow of particulate material of the type which has a tendency to bridge during transportation. A device for imparting vibration is coupled to at least one of the live walls. The live walls are separated from the fixed walls by seams such that the live walls are free to move relative to the fixed walls. By the action of the vibration device, the live walls are moveable relative to each other and to the fixed walls to inhibit the formation of particle bridges and, thus, provide a significant improvement in the capability of controlling the flow of particulate material. This relative wall motion is capable of breaking up bridges of the material that are otherwise likely to form, and of preventing the adhesion and packing of particulate material to or on the walls, thereby allowing the material to flow uniformly through the hopper.

31 Claims, 5 Drawing Sheets

HOPPER WITH MOVING WALL AND METHOD OF MAKING AND USING THE SAME

BACKGROUND OF THE INVENTION

1. Field of the Invention

The present invention relates to improved hoppers and methods of making and using the same and, in particular embodiments, to such hoppers and methods for improved handling of particulate matter.

2. Description of Related Art

Early hopper designs typically were formed of a funnel-shaped housing of rigid, integral construction. A relatively large opening at the top of the housing served as an inlet and a smaller opening at the bottom of the housing served as an outlet.

One example of such a conventional hopper design is that shown at 31 in FIG. 1 of U.S. Pat. No. 3,147,144 to Wilhelm (issued Sep. 1, 1964). Wilhelm's hopper 31 is composed of a four walled structure, with each wall rigidly fixed to two adjacent walls to define a hollow housing having a rectangular horizontal cross-section, a rectangular opening or inlet at the top to receive particulate material P and an opening at the bottom to allow particulate material P to flow out of the housing.

According to its intended mode of operation, the particulate material P flows downward, by the force of gravity, from the top opening toward the bottom opening. However, certain particulate materials have a tendency to form a bridge spanning between two opposing hopper walls (wherein a plurality of closely packed particles forms a bridge or arch rigidly extending from one wall to an opposing wall) during the flow toward the bottom opening. Such particle bridges can restrict or stop the flow of particles through the hopper. In order to address this concern, Wilhelm employs a vibrator 32, mounted on the outside surface of each hopper wall, for imparting a vibrating motion intended to inhibit the formation of particle bridges.

Another conventional hopper design is that shown in FIGS. 1 and 2 of U.S. Pat. No. 3,261,592 to Dumbaugh, et al. (issued Jul. 19, 1966), wherein the hopper housing is formed of a partially cylindrical and partially conical shaped wall supported by resilient mounts 14. Dumbaugh et al.'s hopper is vibrated "from top to bottom along a horizontal path" by an exciter motor 19 mounted to the outside surface of the hopper wall.

In each of the hopper designs described in the above cited Wilhelm and Dumbaugh, et al. patents, the hopper housing is formed of a rigid walled structure to which a vibration imparting device is attached. Typically, in these types of rigid walled structures, vibrations imparted on one wall (or on a portion of the curved wall in the cylindrical and conical housing structure) are transmitted through the rigid structure to all of the walls (or to all other portions of the curved wall). In this regard, two opposing walls (or two opposing portions of a curved wall) will be affected by the same vibratory motion and, thus, may vibrate in the same or close phase and frequency, resulting in little or no relative motion between the two opposing walls (or two opposing portions of a curved wall). Without a suitable degree of relative motion between the two opposing walls (or two opposing portions of a curved wall), the ability of the vibrator to break apart or inhibit the formation of a particle bridge spanning between those opposed walls (or wall portions) is greatly diminished.

Another prior hopper design is that shown in FIG. 1 of U.S. Pat. No. 4,522,500 to Hyer (issued Jun. 11, 1985). Hyer's hopper includes a rigid walled housing 12 defining an open interior in which an agitator assembly 18 is located. The agitator assembly includes an agitator panel 20 situated internally of the hopper housing, a vibration imparting device 24 fixed to a frame 22 situated externally of the hopper housing and a pair of mounts 26 extending through the rigid wall of the hopper housing, coupling the frame 22 to the agitator panel 20. From Hyer's drawings, one can readily appreciate the complexities involved in coupling an externally located vibrator to an internally located moveable panel. Moreover, it would appear that such a design would be susceptible to problems associated with particles, dirt, or the like being trapped between the agitator panel 20 and the interior surface of the housing wall 12.

The above discussed prior hopper designs exemplify the need in the industry for a hopper which (1) has an improved ability for handling particulate material of the type having a tendency to bridge during its flow and (2) has a relatively simple construction. These needs are of particular importance in solid particle moving systems which require a sustained flow of particles to be maintained. For example, certain solids pump designs require, or perform better with, a sustained flow of particles entering the pump. Examples of such solids pump designs are described in U.S. Pat. No. 4,516,674 to Firth (issued May 14, 1985), U.S. Pat. No. 4,988,239 to Firth (issued Jan. 29, 1991) and U.S. Pat. No. 5,051,041 to Firth (issued Sep. 24, 1991), each of which are commonly assigned to the same assignee of the present invention and each of which are incorporated herein by reference. It is preferred that the hoppers which control the flow of particles entering such pumps be of the type which maintain a sustained, constant flow of particles and which minimize the occurrence of particle bridging or arching (which may cause flow interruptions).

SUMMARY OF THE DISCLOSURE

Accordingly, it is an object of the present invention to provide improved hoppers and methods of making and using the same, and in particular embodiments, to such hoppers and methods for improved handling of particulate matter having a tendency to bridge.

These and other objects are accomplished, according to an embodiment of the present invention, by a hopper having at least one moveable or vibrating live wall which is moveable relative to at least one other wall. As discussed in more detail below, hopper embodiments of the present invention are suitable for controlling the flow of particulate material, such as mined minerals, soil, coal or other raw materials, as well as food items, articles of manufacture or the like.

The hopper, according to the embodiment illustrated in the figures, is provided with two opposed live walls and two opposed fixed walls, wherein a wall moving means (such as a vibration device) is coupled to at least one of the live walls. By the action of the wall moving means, the live walls are moveable relative to each other and to the fixed walls to inhibit the formation of particle bridges and, thus, provide a significant improvement in the capability of controlling the flow of particulate material. This relative wall motion is capable of breaking up bridges of the material that are otherwise likely to form above the hopper outlet, and of preventing the adhesion and packing of particulate material to or on the walls, thereby allowing the material to flow uniformly toward the outlet.

The live walls are moveably supported by a frame, while the fixed walls are supported in a fixed relation relative to the frame. The live walls are separated from the fixed walls by seams such that the live walls are free to move relative to the fixed walls. This arrangement allows a high degree of active motion between the live walls and between each live wall and each fixed wall. As a result, particulate matter passing through the hopper interior will be less likely to form a bridge between two opposed walls and, thereby, inhibit the flow of particles. The hopper is, thus, less likely to clog. In addition, the hopper can provide a generally constant, unvarying particle flow rate from its outlet.

BRIEF DESCRIPTION OF THE DRAWINGS

The detailed description will be made with reference to the accompanying drawings, wherein like numerals designate corresponding parts in the several figures.

DETAILED DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of embodiments of the invention. The scope of the invention is best defined by the appended claims.

Figure 1:
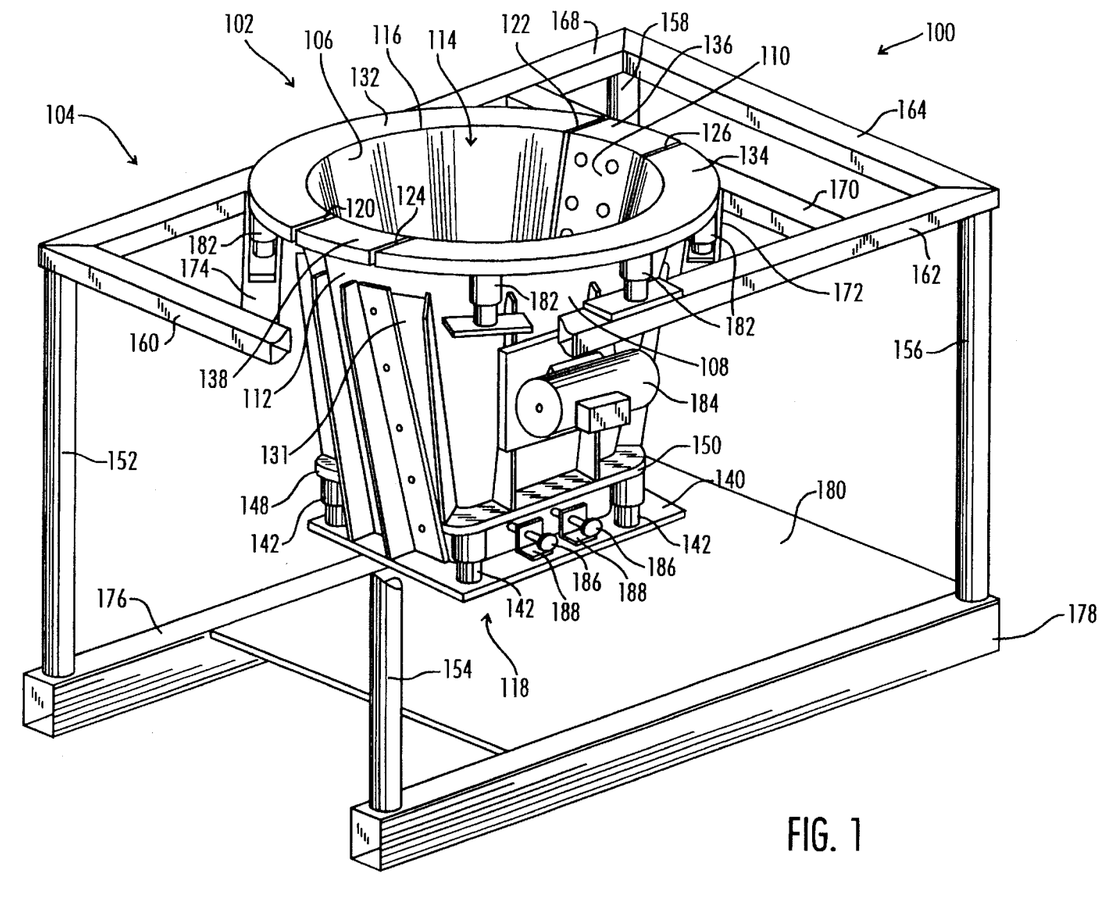
FIG. 1 is a perspective view of an improved hopper according to one embodiment of the present invention.

FIG. 1 is a perspective view of a vibrating live wall hopper 100 according to an embodiment of the present invention. As discussed in more detail below, hopper embodiments of the present invention are suitable for controlling the flow of particulate material, such as mined minerals, soil, coal or other raw materials, as well as food items, articles of manufacture or the like. While various embodiments may also be suitable for controlling the flow of materials other than particulate materials, the use of the hopper to control the flow of particulate material raises various concerns, especially where the particulate material is composed of particles of varying size and shape (such as raw coal or other mined materials).

Particulate material, especially if composed of varying size and shape particles, tends to form bridges spanning between opposing walls or surfaces along the flow path of the material. These bridges can create a barrier, inhibiting or completely blocking the flow of particles along the flow path. In addition, these bridges can intermittently form and then break apart, causing the flow rate of the particles to vary and become unpredictable. As discussed in more detail below, hopper 100 is provided with live walls and fixed walls, wherein the live walls are moveable relative to each other and to the fixed walls to inhibit the formation of particle bridges and, thus, provide a significant improvement in the capability of controlling the flow of particulate material. This relative wall motion is capable of breaking up bridges of the material that are otherwise likely to form above the hopper outlet, and of preventing the adhesion and packing of particulate material to or on the walls, thereby allowing the material to flow uniformly toward the outlet.

The hopper 100 shown in FIG. 1 is particularly well suited for controlling the flow of particulate material supplied to the hopper from, for example, a pipe having a circular cross-section, and supplied from the hopper to, for example, the rectangular inlet opening of a solids pump of the type described in U.S. Pat. No. 4,516,674 to Firth, U.S. Pat. No. 4,988,239 to Firth and U.S. Pat. No. 5,051,041 to Firth, each of which is cited above in the Background of the Invention section. However, it will be recognized that further embodiments of the present invention may be suitable for controlling the flow of particulate or other materials in various other contexts, such as (but not limited to) controlling the flow of articles of manufacture or raw materials into containers or onto conveyor belts or other transportation devices.

The hopper 100 comprises, generally, a hopper housing 102 supported by a hopper frame 104. The housing 102 has two opposed live walls 106 and 108 and two opposed fixed walls 110 and 112. The four walls 106, 108, 110 and 112 define a hollow interior 114 through which particulate material passes, an inlet 116 through which particulate material flows into the hopper interior and an outlet 118 through which particulate material flows out of the hopper interior. Preferably, the flow of particles into the inlet 116, through the interior 114 and out of the outlet 118 is driven by gravitational force. However, further embodiments may employ other means, such as gas, fluid or particle flow pressure, to drive the particulate material through the hopper housing.

As discussed in more detail below, the live walls 106 and 108 are moveably supported by the frame 104, while the fixed walls 110 and 112 are supported in a fixed relation relative to the frame 104. This arrangement allows a high degree of active motion between the live walls 106 and 108 and between each live wall and each fixed wall 110 and 112. As a result, particulate matter passing through the hopper interior 114 will be less likely to form a bridge between two opposed walls and, thereby, inhibit the flow of particles. The hopper is, thus, less likely to clog. In addition, the hopper can provide a generally constant, unvarying particle flow rate from its outlet.

As shown in FIG. 1, the live wall 106 is separated from fixed wall 112 by a seam 120 and is separated from fixed wall 110 by a seam 122. As a result, live wall 106 is free to move relative to the fixed walls 110 and 112. Similarly, live wall 108 is separated from fixed walls 112 and 110 by seams 124 and 126, respectively, and is free to move relative to the fixed walls. In order to facilitate such relative movement of the live walls 106 and 108, the live walls are moveably coupled to the frame 104, while the fixed walls 110 and 112 are fixed to the bottom mounting plate 140 as discussed in more detail below.

In preferred embodiments, a seal is provided along seams 120, 122, 124 and 126, so as to inhibit the passage of particles, dust, or the like into or through the seams. In the illustrated embodiment, the seal comprises a strip or sheet of flexible material 128 extending across and along the length of each seam and coupled, by bolts, to the fixed and live walls defining the seam. In further embodiments, other suitable means for securing the flexible material to the hopper walls may be used, including, but not limited to, adhesives, rivets or the like. Alternatively, the flexible material may be arranged adjacent to one or more hopper walls, without physically coupling the flexible material to the wall. The flexible material allows relative motion between the live and fixed walls, while providing a barrier for the passage of particles, dust or the like through the seam between the walls.

In the illustrated embodiment, the flexible material strips are coupled to the live and fixed walls, along the interior of the hopper housing 102. Depending upon the type of flexible material used for the seal, it may be desirable to secure a sheet or strip of a relatively durable material having a low coefficient of friction to the hopper interior facing surface of each flexible sheet or strip. This additional sheet or strip of material on the hopper interior facing surface of each flexible sheet or strip is particularly preferred, if the flexible material has a tendency to abrade or otherwise be damaged by contacting particles as the particles flow through the hopper housing, and/or if the flexible material has a relatively high coefficient of friction which would tend to hinder the flow of particles through the hopper housing.

Figure 2:
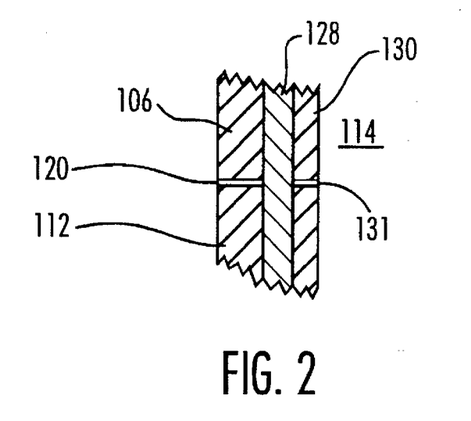
FIG. 2 is a cross-section view of a portion of the hopper housing of the embodiment in FIG. 1.

This preferred embodiment is further illustrated in FIG. 2, which shows a portion of each of the fixed wall 112, the live wall 106, a sheet or strip of flexible material 128 extending across the seam 120 and a sheet or strip of durable material 130 on the surface of the flexible material 128 which faces the hopper housing interior 114. In the illustrated embodiment, the sheet of durable material 130 has a seam 121 arranged in line with the seam 120 between the fixed and live walls 112 and 106 to maximize the ability of the live wall 106 to move relative to the fixed wall 112. In further preferred embodiments, a layer of the durable material 130 may also be provided on the interior facing surfaces of each hopper housing wall, for example, to reduce the coeficient of friction of the interior facing surface of the hopper housing and/or to increase the abrasion resistance of the hopper housing walls.

A seal blow-out prevention plate 131 is coupled to the exterior surface of each fixed wall 112 and 110, and extends over the seams 120 and 124 or the seams 122 and 126, on the exterior of the hopper housing. The plate 131 inhibits the flexible material 128 from being pressed through the seams between the live and fixed walls by pressure within the hopper housing.

In preferred embodiments, the hopper housing walls 106, 108, 110 and 112 are made of steel. In further embodiments, the walls may be made of other high strength material, other alloys or pure metals, plastics or other resin based materials, ceramics, wood or the like. The flexible material 128 is preferably a synthetic or natural rubber or rubber-like material, neoprene, natural or synthetic fabric or the like. The durable material 130 is preferably an ultra-high molecular weight polyethylene, such as that sold under the trademark TIVAR 88. Alternatively, material 130 may be other suitable materials, such as metals, metal alloys, plastics or other resin based materials, ceramics, wood or the like.

Figure 3:
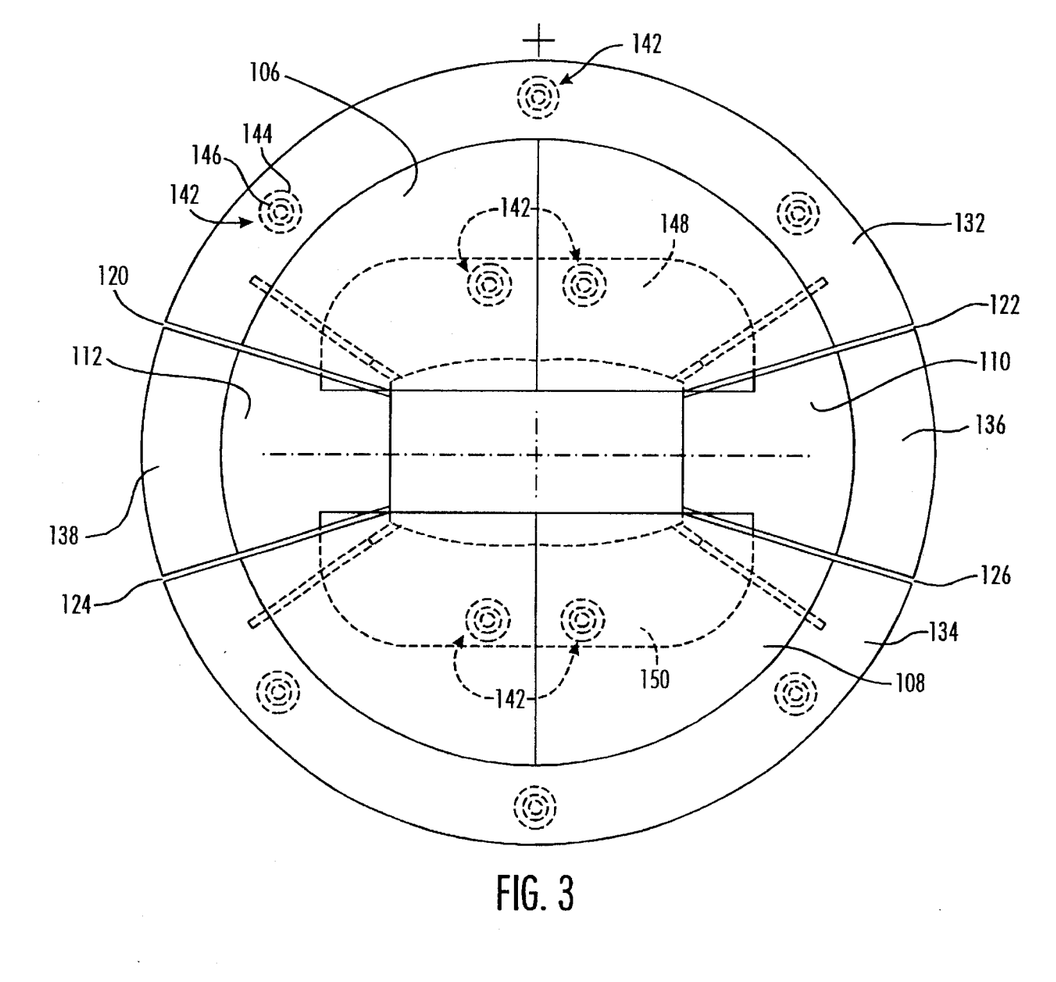
FIG. 3 is a top view of the hopper housing of the embodiment in FIG. 1.
Figure 4:
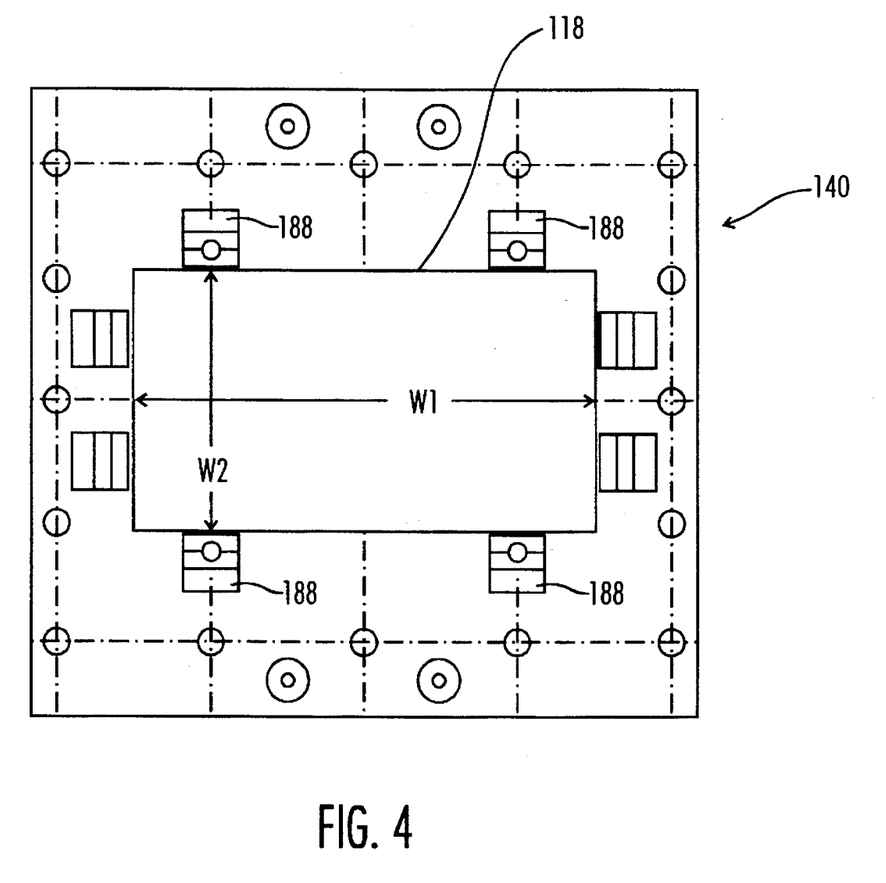
FIG. 4 is a top view of the bottom mounting plate of the embodiment in FIG. 1.

As shown in FIG. 1, each wall 106, 108, 110 and 112 has an upper flange portion 132, 134, 136 and 138, respectively. The flange portions 132, 134, 136 and 138 form an annular upper flange surrounding the circular inlet 116. The fixed walls 110 and 112 are fixed to a rectangular bottom mounting plate 140 having a rectangular outlet opening 118. FIG. 3 is a top view of the hopper housing walls 106, 108, 110 and 112, showing the round inlet opening 116. FIG. 4 is a top view of the bottom mounting plate 140, showing the rectangular outlet opening 118.

The fixed walls 110 and 112 are secured to the bottom mounting plate 140 in a fixed relation relative to the bottom mounting plate by any suitable fixed mounting means, such as welds, rivets, bolts, or the like. Alternatively, the fixed walls 110 and 112 and the bottom mounting plate 140 may be formed as a unitary structure, e.g. by cast molding or other suitable processes. The live walls 106 and 108 are moveably secured to the bottom mounting plate 140 by moveable securing means, such as the spring loaded, telescoping tube structures 142 shown in the figures.

The spring tube structures 142 each comprise a large diameter outer tube 144 in which a smaller diameter inner tube 146 is moveable in a telescoping manner relative to the outer tube. A spring 145 is housed within the outer tube 144 and biases the inner tube 146 against movement of the inner tube further into the interior of the outer tube. The large diameter tubes 144 of the spring tube structures 142 are fixed to a shelf 148 extending from the live wall 106 and a shelf 150 extending from live wall 108. The small diameter tube 146 of each structure 142 is fixed to a bottom mounting plate 140 which is, itself, adjustable, e.g., by virtue of mounting bolts located in each supporting member 162, 168, 170, 172, 174 extending through bolt holes in the cup plate and through elongated bolt holes (elongated in the radial direction of the bolt) in the frame member (or by virtue of other suitable adjustment means). This adjustment enables the spring to be centralized within the large tube 144 and the small tube 146 in response to changing weight of the material in the hopper.

The spring tube structures 142 couple each live wall 106 and 108 to the bottom mounting plate 140, while allowing limited vertical and lateral motion between the live walls 106 and 108 and the plate 140, therefore forming an elliptical path. In addition, the spring tube structures 142 prevent excessive motion of the live wall so that the wall, as well as adjacent walls and structure, are less likely to be damaged after prolonged, vigorous movement of the live wall. It will be understood that further embodiments employ other suitable moveable coupling means, as an alternative to the above discussed spring tube structures 142, to couple the live walls 106 and 108 to the plate 140 and allow relative motion therebetween. Such alternative moveable coupling means may comprise, for example, pneumatic devices, rubber or rubber-like cushions, coil springs, leaf springs, or the like.

In the FIG. 1 embodiment, the hopper housing 102 is supported by the hopper frame 104. The frame 104 includes a number of vertical members 152, 154, 156 and 158 for supporting a number of horizontal members 160, 162, 164, 166, 168, 170, 172 and 174 above a base composed of two base beams 176 and 178 and a base board 180. As shown in the FIG. 1, the horizontal members 160, 162, 170 and 168 form a rectangle about the upper portion of the hopper housing 102.

Horizontal member 172 truncates the corner of the rectangle formed by horizontal members 162 and 170, while horizontal member 174 truncates the corner of the rectangle formed by horizontal members 160 and 168. Another horizontal member (hidden from view in FIG. 1) truncates the corner formed by horizontal members 168 and 170 and a further horizontal member (removed from FIG. 1 in the cut-away portion of the figure) truncates the corner formed by horizontal members 160 and 162. The live walls of the hopper housing are moveably secured to certain horizontal members by moveable coupling means 182, such as those discussed above with respect to spring tube structures 142 and suitable alternatives thereof. The fixed walls 110 and 112 are coupled, in a fixed relation, to horizontal members 170 and 160, respectively, by fixed mounting means (not shown) such as a rigid bracket, welds, bolts, or the like.

The frame 104 is dimensioned such that a portion of the length of horizontal member 160 extends below the flange portion 138 of the fixed wall 112. Likewise, a portion of the length of horizontal member 170 extends below the flange portion 136 of the fixed wall 110, a portion of the length of horizontal member 162 extends below the flange portion 134 of the live wall 108, a portion of the length of horizontal member 168 extends below the flange portion 132 of the live wall 106, a portion of the length of horizontal member 172 extends below the flange portion 134 of the live wall 108 and a portion of the length of horizontal member 174 extends below the flange portion 132 of the live wall 106. In addition, a portion of the length of the horizontal members (not shown) which truncate the corners between members 160 and 162 and between members 168 and 170 extend below the flange portions 134 and 132 of live walls 108 and 106, respectively.

As shown in FIG. 1, the moveable coupling means 182 are positioned between the flange portions of the live hopper walls and the underlying portions of the horizontal members 162, 168, 172, 174 and the two horizontal members not illustrated in FIG. 1. This enables the live walls 106 and 108 to be moveable relative to the frame 104. However, because the fixed walls 110 and 112 are fixed to the horizontal members 170 and 160, respectively, these walls are not moveable relative to the frame 104.

The baseboard 180 is supported below at least a portion of the hopper housing 102 by the base beams 176 and 178. The baseboard 180 is provided for supporting a piece of equipment to which the particulate material passing through the hopper housing 102 is fed. As discussed above, such equipment may be, for example, a solids pump of the type described in the Firth patents cited above. The bottom mounting plate 140 may be fixedly secured around the inlet of the equipment to which the hopper feeds the particulate material.

A means for moving the live wall 108 is coupled to the wall. Similar means (not shown) may be coupled to live wall 106. In the illustrated embodiment, the means for moving the live wall 108 comprises a vibration imparting device 184, such as an eccentric weight rotary vibrator, mounted to the outside surface of the live wall 108. However, it will be recognized that any suitable mechanism for moving the live wall 108 may be employed as an alternative to an eccentric weight rotary vibrator. For example, other types of vibrators, pneumatic devices, motors or the like may be used as an alternative to an eccentric weight rotary vibrator.

Preferably, the vibration device 184 is mounted to the live wall at a location at or below the mid-point of the vertical height of the wall. This allows the vibration device to impart vibrations onto the wall at a location adjacent the portion of the hopper housing interior in which particle bridging is most likely to occur (the portion of the hopper housing interior located below the mid-point of the vertical height of the hopper housing). That is, particle bridging is most likely to occur in the portion of the hopper interior at which the opposing walls of the hopper are relatively close together, i.e., near the outlet. In further embodiments, a vibration device or wall moving motor may be located remote from the live wall, but coupled thereto through suitable linkage, such as a spring linkage or solid linkage structure.

With the recognition that particle bridging is most likely to occur near the outlet (where the opposed housing walls are relatively close together), preferred embodiments employ the live wall coupled to the wall moving means (e.g., vibration device) near the outlet. By so locating the live wall and the vibration device and by supporting the live wall for ready movement to inhibit bridging, the vertical height of the hopper walls may be less than typical, conventional hoppers. (It was previously believed that a relatively large hopper wall vertical height was beneficial for maintaining a relatively high pressure within the hopper housing to inhibit bridging.) In this regard, the size and, thus, the weight of each hopper wall may be less than standard high wall hoppers. With the reduced size and weight, the live hopper walls are more readily moveable and less likely to fatigue or cause the moveable wall support structures to fatigue. Accordingly, the apparatus can be designed with smaller wall support structures and vibration devices than was previously considered practical.

The wall moving means (e.g., vibration device 184) imparts a movement force (e.g., a vibration force) on the live wall 108. Since the live wall 108 is moveably coupled to the bottom mounting plate 140 and the frame 104, as discussed above, the movement force imparted by the wall moving means causes the live wall 108 to move (or vibrate) relative to the plate 140 and the frame 104. Moreover, the seams 124 and 126 between the live wall 108 and the fixed walls 112 and 110, respectively, allow the live wall 108 to move relative to the fixed walls 110 and 112 and the other live wall 106. The moveable coupling means 142 and 182, the seams 124 and 126 separating the live wall 108 from the fixed walls, and the flexible material 128 function, not only to allow the live wall 108 to move relative to the other hopper walls, but also function to isolate each live wall 108 from the other hopper walls, minimizing the transfer of motion (or vibrations) to the other walls, the frame 104 and the equipment to which the mounting plate 140 may be coupled.

Preferably, a second wall moving means (not shown), such as a vibration device 184 or alternatives as discussed above, is coupled to live wall 106. In this embodiment, each live wall 106 and 108 is moved by a separate wall moving means, such that the walls 106 and 108 will move or vibrate seemingly independent of and relative to each other. As a result, particulate material passing through the hopper housing will be less likely to form bridges between or adhere to the live walls.

As noted above, the hopper housing 102 defines a circular inlet 114 and a rectangular outlet 118. The rectangular outlet 118 defines a long width W1 and a short width W2. Also as noted above, this design is particularly suitable for receiving particulate material from a pipe having a round cross-section (about the size of the round inlet 114) and for delivering particulate material to apparatus or equipment having a rectangular inlet (about the size of the rectangular outlet 118). However, it will be recognized that further embodiments of the invention may have hopper housings defining different shaped inlets, outlets and interiors than that shown in FIG. 1. For example, further embodiments may have rectangular (or any polygonal or closed curve shaped) openings for the inlet and/or the outlet.

In embodiments, such as the illustrated embodiment, wherein two opposed walls are closer together than other opposed walls near the outlet, it is preferred that at least one of the two "closer together" walls be a live wall, moveable relative to its opposed wall. (Hence, the distance between live walls 106 and 108 adjacent the outlet 118 is smaller than the distance between fixed walls 110 and 112 adjacent the outlet). This is because particle bridges are more likely to form so as to span from one of the "closer together" walls to its opposed wall.

In the illustrated embodiment, the "closer together" walls (live walls 106 and 108) may be adjusted relative to each other adjacent the outlet 118, so as to adjust the short width W2 of the outlet 118. Positioning means are provided for controlling the size and shape of the outlet 118. In the illustrated embodiment, such positioning means comprise bolts 186 which extend through brackets 188 fixed to the bottom mounting plate 140 and abut against springs which, themselves, abut the lower portion of the live wall 108 for adjusting and controlling the position of the live wall 108 and, thereby adjusting and controlling the width W2 of the outlet 118. Similar positioner bolts and springs are provided adjacent the live wall 106 for controlling the position of that wall. Such spring and bolt structures are discussed below with respect to the thrust springs 189. In further embodiments, any combination or all of the walls of the hopper housing may be provided with positioning means. In addition, further embodiments may employ other types of positioning apparatus as an alternative to the illustrated positioning bolt and bracket arrangement.

Figure 5:
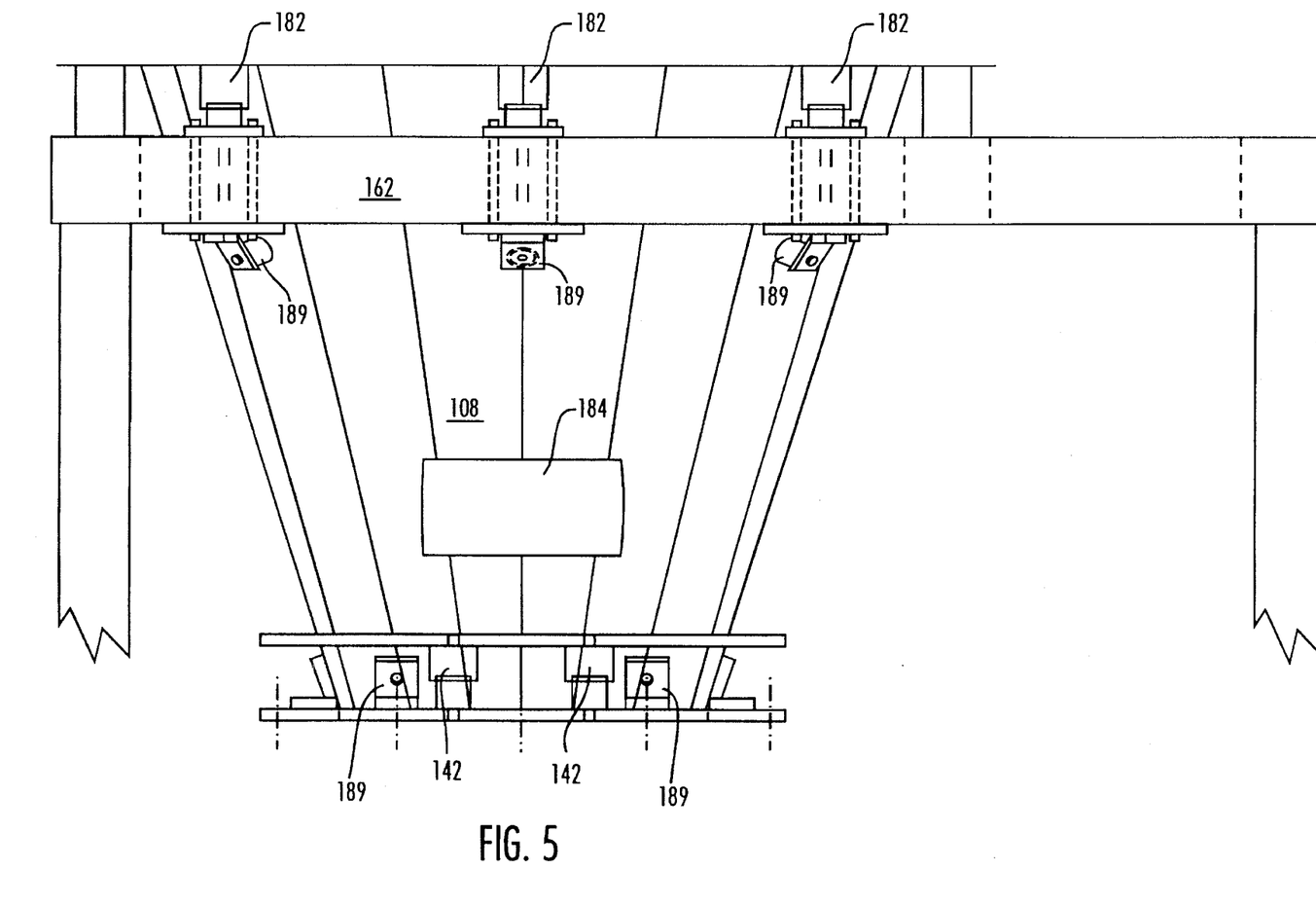
FIG. 5 is a side view of the hopper of the FIG. 1 embodiment.
Figure 6:
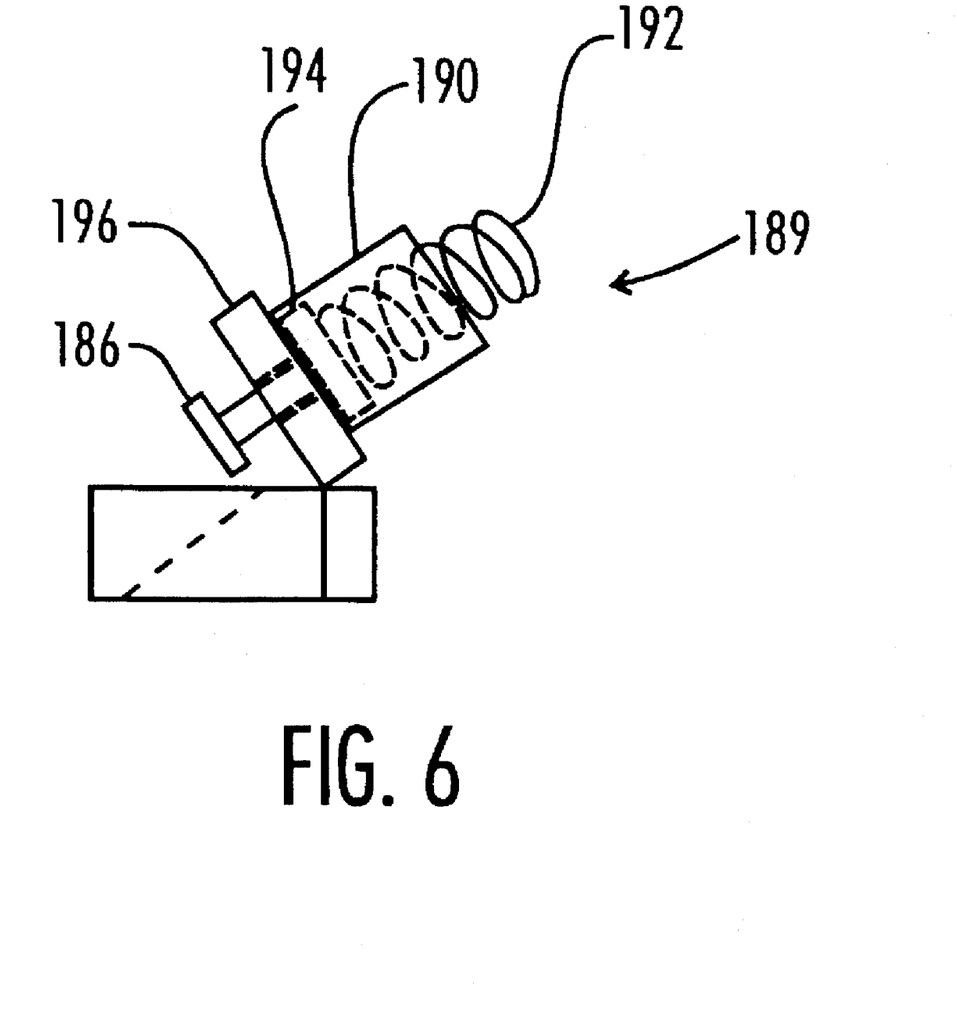
FIG. 6 is a side view of a thrust spring according to an embodiment of the invention.

In the embodiment shown in FIGS. 5 and 6, the thrust springs 189 comprise a cup-shaped housing 190, in which a coil spring 192 and a spring abutting plate 194 are disposed. The coil spring has a free end (directed to the right side of FIG. 6) positioned to urge against one of the live walls. The bolt 186 extends through a threaded aperture in a bracket 196 and controls the location of plate 194 within the housing 190 to, thereby, control the spring tension. Similar thrust springs 189 may be mounted to the horizontal members of the frame 104 which surround the hopper housing, as shown in FIG. 5.

In a preferred embodiment, two thrust springs 189 are provided adjacent the lower end of each live wall, between the live wall and the base 140 and two or three thrust springs are provided adjacent the upper end of each live wall, between the live wall and the frame 104. Other embodiments may employ fewer or more thrust springs at these or other suitable locations. The thrust springs operate to minimize lateral vibratory movement of the live walls, while allowing the walls to vibrate, primarily in the vertical direction.

While the illustrated embodiment employs two live walls and two fixed walls, it will be recognized that further embodiments may employ any suitable number of walls, wherein any one or combination of the walls may be live. In further embodiments, all of the hopper walls may be live and moveable relative to other hopper walls. For example, with reference to FIG. 3 the walls 110 and 112 may be mounted for movement in the same manner as discussed above with respect to walls 106 and 108.

The presently disclosed embodiments are to be considered in all respects as illustrative and not restrictive. The scope of the invention being indicated by the appended claims, rather than the foregoing description, and all changes which come within the meaning and range of equivalency of the claims are, therefore, intended to be embraced therein.

What is claimed is:

1. A hopper for controlling the flow of particulate material, said hopper comprising:

a housing having a first wall and a generally rigid second wall supported for movement relative to the first wall in at least the vertical direction, said first and second walls being supported such that, at any given moment, at least one location on the first wall is in a common horizontal plane with at least one location on the second wall, said housing defining an open interior between the first and second walls, an inlet through which particulate material flows into the housing interior and an outlet through which particulate material flows out of the housing interior; and means, operatively coupled to said second wall, for moving said entire second wall relative to said first wall in at least said vertical direction.

2. A hopper as recited in claim 1, further comprising means, operatively coupled to said first wall, for moving said first wall.

3. A hopper as recited in claim 2, wherein said means for moving said second wall comprises a vibrator.

4. A hopper as recited in claim 1, wherein said housing further includes third and fourth walls, wherein said first and second walls define first and second surfaces, respectively, which face each other across the housing interior and said third and fourth walls define third and fourth surfaces, respectively, which face each other across the housing interior.

5. A hopper as recited in claim 4, wherein said housing is configured such that the distance between said first and second walls, adjacent said outlet, is smaller than the distance between said third and fourth walls, adjacent said outlet.

6. A hopper as recited in claim 1, wherein said means for moving comprises a vibrator.

7. A hopper as recited in claim 1, wherein said first and second walls each define a respective interior facing surface and a respective exterior facing surface, the interior facing surface of said first wall faces the interior facing surface of said second wall across the housing interior and the exterior facing surfaces of each of the first and second walls define a respective portion of the exterior of the housing.

8. A hopper as recited in claim 7, wherein said means for moving comprises a vibrator coupled to the exterior surface of the second wall.

9. A hopper for controlling the flow of particulate material, said hopper comprising:

a housing having a first wall and a generally rigid second wall supported for movement relative to the first wall in at least the vertical direction, said housing defining an open interior between the first and second walls, an inlet through which particulate material flows into the housing interior and an outlet through which particulate material flows out of the housing interior; and means, operatively coupled to said second wall, for moving said entire second wall relative to said first wall in at least said vertical direction;

wherein said first and second walls each define a respective interior facing surface and a respective exterior facing surface, the interior facing surface of said first wall faces the interior facing surface of said second wall across the housing interior and the exterior facing surfaces of each of the first and second walls define a respective portion of the exterior of the housing;

wherein said means for moving comprises a vibrator coupled to the exterior surface of the second wall; and wherein said inlet is located vertically higher than the outlet, and wherein the vibrator is coupled to the second wall between the inlet and the outlet at a location vertically displaced from the outlet by a distance smaller than the vertical displacement from the inlet.

10. A hopper for controlling the flow of particulate material, said hopper comprising:

a housing having a first wall and a second wall, the second wall supported for movement relative to the first wall in at least the vertical direction, said first and second walls being supported such that, at any given moment, at least one location on the first wall is in a common horizontal plane with at least one location on the second wall, said housing defining an open interior between the first and second walls, an inlet through which particulate material flows into the housing interior and an outlet through which particulate material flows out of the housing interior; and means, operatively coupled to said second wall, for moving said second wall relative to said first wall;

wherein said housing further includes third and fourth walls, wherein said first and second walls define first and second surfaces, respectively, which face each other across the housing interior and said third and fourth walls define third and fourth surfaces, respectively, which face each other across the housing interior; and means, operatively coupled to said third wall, for moving said third wall relative to said fourth wall.

11. A hopper for controlling the flow of particulate material, said hopper comprising:

a housing having a first wall and a second wall, the second wall supported for movement relative to the first wall in at least the vertical direction, said first and second walls being supported such that, at any given moment, at least one location on the first wall is in a common horizontal plane with at least one location on the second wall, said housing defining an open interior between the first and second walls, an inlet through which particulate material flows into the housing interior and an outlet through which particulate material flows out of the housing interior;

means, operatively coupled to said second wall, for moving said second wall relative to said first wall;

means operatively coupled to said first wall, for moving said first wall; and wherein said first and second walls each define a respective interior facing surface and a respective exterior facing surface and said means for moving said second wall comprises a first vibrator coupled to the exterior facing surface of the second wall and said means for moving said first wall comprises a second vibrator coupled to the exterior surface of said first wall.

12. A hopper for controlling the flow of particulate material, said hopper comprising:

a housing having a first wall and a second wall, the second wall supported for movement relative to the first wall in at least the vertical direction, said housing defining an open interior between the first and second walls, an inlet through which particulate material flows into the housing interior and an outlet through which particulate material flows out of the housing interior;

means, operatively coupled to said second wall, for moving said second wall relative to said first wall;

means operatively coupled to said first wall, for moving said first wall; and wherein said first and second walls each define a respective interior facing surface and a respective exterior facing surface and said means for moving said second wall comprises a first vibrator coupled to the exterior facing surface of the second wall and said means for moving said first wall comprises a second vibrator coupled to the exterior surface of said first wall; and wherein the inlet is located vertically higher than the outlet, and wherein the first vibrator is coupled to the second wall between the inlet and the outlet at a location vertically displaced from the outlet by a distance smaller than the vertical displacement from the inlet and wherein said second vibrator is coupled to said first wall between the inlet and the outlet at a location vertically displaced from the outlet by a distance smaller than the vertical displacement from the inlet.

13. A hopper for controlling the flow of particulate material, said hopper comprising:

a housing having a first wall and a second wall, the second wall supported for movement relative to the first wall, said first and second walls being supported such that, at any given moment, at least one location on the first wall is in a common horizontal plane with at least one location on the second wall, said housing defining an open interior between the first and second walls, an inlet through which particulate material flows into the housing interior and an outlet through which particulate material flows out of the housing interior;

means, operatively coupled to said second wall, for moving said second wall relative to said first wall;

a frame for supporting the first and second housing walls; and moveable coupling means for coupling the second wall to the frame in a manner which allows relative movement between the second wall and the frame.

14. A hopper as recited in claim 13, wherein said moveable coupling means comprises a spring.

15. A hopper for controlling the flow of particulate material, said hopper comprising:

a housing having a first wall and a second wall, the second wall supported for movement relative to the first wall, said housing defining an open interior between the first and second walls, an inlet through which particulate material flows into the housing interior and an outlet through which particulate material flows out of the housing interior;

means, operatively coupled to said second wall, for moving said second wall relative to said first wall;

a frame for supporting the first and second housing walls; and moveable coupling means for coupling the second wall to the frame in a manner which allows relative movement between the second wall and the frame;

wherein said moveable coupling means comprises outer and inner tubes arranged in a telescoping manner with the inner tube slideable within the outer tube and a spring within the outer tube.

16. A hopper for controlling the flow of particulate material, said hopper comprising:

a housing having a first wall and a second wall, the second wall supported for movement relative to the first wall, said first and second walls being supported such that, at any given moment, at least one location on the first wall is in a common horizontal plane with at least one location on the second wall, said housing defining an open interior between the first and second walls, an inlet through which particulate material flows into the housing interior and an outlet through which particulate material flows out of the housing interior;

means, operatively coupled to said second wall, for moving said second wall relative to said first wall;

wherein said housing further includes third and fourth walls, said first and second walls define first and second surfaces, respectively, which face each other across the housing interior and said third and fourth walls define third and fourth surfaces, respectively, which face each other across the housing interior;

a frame for supporting the first, second, third and fourth housing walls; and moveable coupling means for coupling the first and second walls to the frame in a manner which allows relative movement between the first wall and the frame and between the second wall and the frame.

17. A hopper as recited in claim 16, wherein said moveable coupling means comprises a spring.

18. A hopper for controlling the flow of particulate material, said hopper comprising:

a housing having a first wall and a second wall, the second wall supported for movement relative to the first wall, said housing defining an open interior between the first and second walls, an inlet through which particulate material flows into the housing interior and an outlet through which particulate material flows out of the housing interior;

means, operatively coupled to said second wall, for moving said second wall relative to said first wall;

wherein said housing further includes third and fourth walls, said first and second walls define first and second surfaces, respectively, which face each other across the housing interior and said third and fourth walls define third and fourth surfaces, respectively, which face each other across the housing interior, said hopper further comprising:

a frame for supporting the first, second, third and fourth housing walls; and moveable coupling means for coupling the first and second walls to the frame in a manner which allows relative movement between the first wall and the frame and between the second wall and the frame;

wherein said moveable coupling means comprises outer and inner tubes arranged in a telescoping manner with the inner tube slideable within the outer tube and a spring within the outer tube.

19. A hopper for controlling the flow of particulate material, said hopper comprising:

a hopper housing having a plurality of walls defining a housing interior, each wall arranged adjacent at least one other of said walls and separated therefrom by a seam, said plurality of walls including at least one live wall supported for movement of the entire live wall relative to the adjacent wall in at least the vertical direction, said plurality of walls being supported such that, at any given moment, at least one location on any one wall is in a common horizontal plane with at least one location on each of the other walls; and a motor operatively coupled to the at least one live wall for moving said at least one live wall relative to the adjacent wall.

20. A hopper as recited in claim 19, further comprising a seal made of flexible material disposed adjacent each seam for inhibiting particulate material from entering the seam.

21. A hopper as recited in claim 19, further comprising a layer of durable material provided on each of the plurality of walls.

22. A hopper as recited in claim 19, wherein said at least one live wall comprises said plurality of walls, such that each of said hopper housing walls is supported for movement relative to each one of the rest of said hopper housing walls.

23. A hopper for controlling the flow of particulate material, said hopper comprising:

a hopper housing having a plurality of walls defining a housing interior, each wall arranged adjacent at least one other of said walls and separated therefrom by a seam, said plurality of walls including at least one live wall supported for movement relative to the adjacent wall;

a motor operatively coupled to the at least one live wall for moving said at least one live wall relative to the adjacent wall; and a seal adjacent each seam for inhibiting particulate material from entering the seam, the seal having a layer of durable material arranged adjacent each seam and a layer of flexible material arranged between the hopper walls and the durable material.

24. A hopper as recited in claim 23, wherein said durable material comprises an ultra-high molecular weight polyethylene.

25. A hopper for controlling the flow of particulate material, said hopper comprising:

a hopper housing having a plurality of walls defining a housing interior, each wall arranged adjacent at least one other of said walls and separated therefrom by a seam, said plurality of walls including at least one live wall supported for movement of the entire live wall relative to the adjacent wall in at least the vertical direction; and a motor operatively coupled to the at least one live wall for moving said at least one live wall relative to the adjacent wall;

wherein said hopper housing further comprising a bottom support plate defining a hopper outlet and wherein said at least one live wall is moveably coupled to the bottom support plate for movement relative to the bottom support plate.

26. A hopper for controlling the flow of particulate material, said hopper comprising:

a hopper housing having a plurality of walls defining a housing interior, each wall arranged adjacent at least one ether of said walls and separated therefrom by a seam, said plurality of walls including at least one live wall supported for movement of the entire live wall relative to the adjacent wall in at least the vertical direction;

a motor operatively coupled to the at least one live wall for moving said at least one live wall relative to the adjacent wall; and a layer of durable material provided on each of the plurality of walls;

wherein said durable material comprises an ultra-high molecular weight polyethylene.

27. A hopper for controlling the flow of particulate material, said hopper comprising:

a housing having a first wall and a second wall, the second wall supported for movement in a generally elliptical path relative to the first wall, said first and second walls being supported such that, at any given moment, at least one location on the first wall is in a common horizontal plane with at least one location on the second wall, said housing defining an open interior between the first and second walls, an inlet through which particulate material flows into the housing interior and an outlet through which particulate material flows out of the housing interior; and means, operatively coupled to said second wall, for moving said second wall relative to said first wall in a generally elliptical path.

28. A hopper as recited in claim 27, further comprising means, operatively coupled to said first wall, for moving said first wall.

29. A hopper as recited in claim 27, wherein said housing further includes third and fourth walls, wherein said first and second walls define first and second surfaces, respectively, which face each other across the housing interior and said third and fourth walls define third and fourth surfaces, respectively, which face each other across the housing interior.

30. A hopper as recited in claim 27, wherein said means for moving said second wall comprises a rotary vibrator.

31. A method of controlling the flow of particulate material through a hopper, said method comprising the steps of:

providing a housing having a first wall, a second wall and an open interior between the first and second wall;

supporting the second wall for movement relative to the first wall such that, at any given moment, at least one location on the first wall is in a common horizontal plane with at least one location on the second wall;

passing material through the inlet into the housing interior and out of the housing interior through an outlet; and moving the second wall in a generally elliptical path relative to the first wall.

* * * * *